Figure 1:
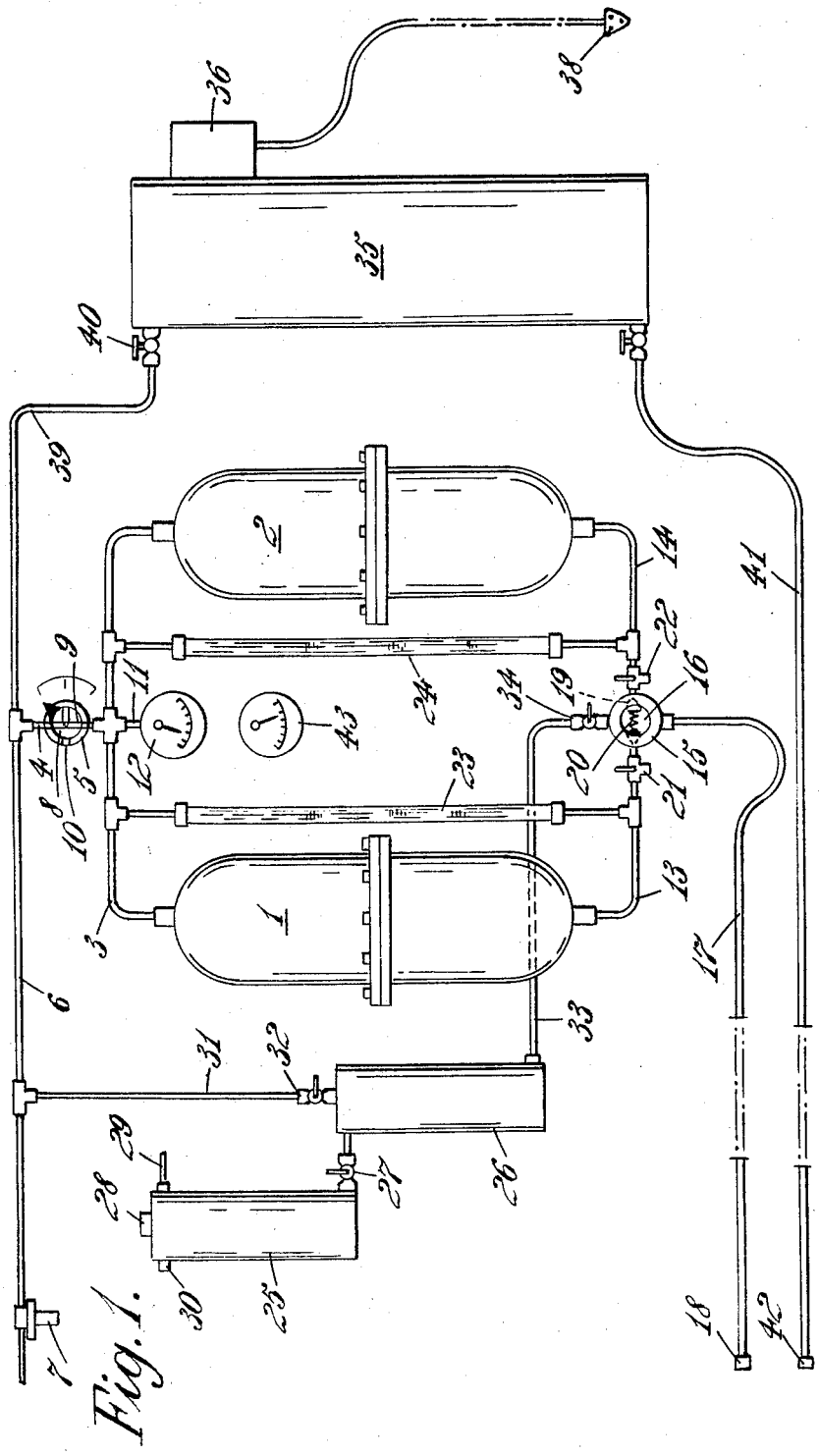

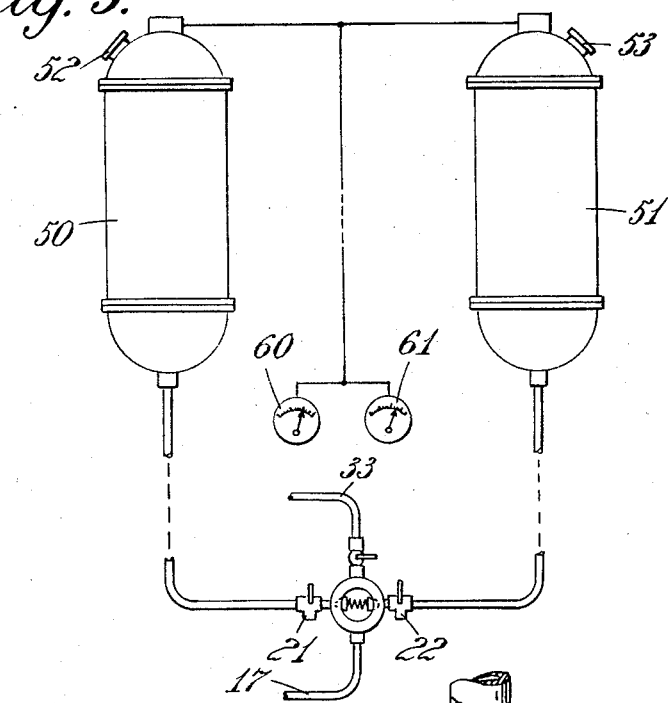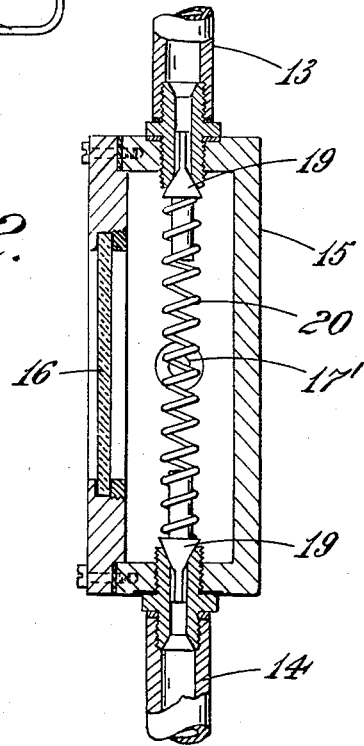

United States Patent Office 2,862,239
Patented Dec. 2, 1958

2,862,239

INJECTION MOULDING PROCESSES AND APPARATUS THEREFOR

Harold John Pollard and John Rees, Bristol, England, assignors, by mesne assignments, to Bristol Aircraft Limited, Bristol, England, a British company Application November 14, 1955, Serial No. 546,699

Claims priority, application Great Britain October 25, 1955

17 Claims. (Cl. 18—30)

This invention relates to injection moulding processes and apparatus therefor, and concerns processes and apparatus for injecting into moulds a mixture of a setting liquid resin with a catalyst and an accelerator, the mixture being such that the resin solidifies at room temperatures in a commercially acceptable time, say a maximum of two hours and preferably less than one hour. Resin mixtures of this kind are hereinafter referred to as resin mixtures of the kind described.

When using resin mixtures of the kind described in injection apparatus the difficulty is encountered that the apparatus rapidly becomes clogged with set or partially set mixture, and a principal object of the present invention is to reduce the extent of the apparatus subject to such clogging, while still ensuring thorough mixing of the ingredients.

According to the invention, two separate quantities of resin are mixed one with a quantity of catalyst and the other with a quantity of accelerator, the ratio of the ingredients of each mixture being such that when the two mixtures are combined in a predetermined ratio the combined mixture will be a mixture of the kind described, the two mixtures are then caused to flow together in the said predetermined ratio and become homogeneously mixed, and the mixed flow is passed immediately into a mould.

In this way only the mixing means for the two flows and the pipe carrying the mixture to the mould are subject to clogging by the rapidly setting mixture, and to reduce or eliminate the clogging, after each injection, or at suitable longer intervals, when small mouldings are being made, the mixing means and the injection pipe may be flushed through with a solvent, for example acetone, capable of removing any partially set resin mixture that may be present in these parts.

The mixture of resin and accelerator is subject to slow setting and parts of the apparatus in contact with this mixture are preferably cleaned daily. The mixture of resin and catalyst has very little tendency to set and parts of the apparatus in contact with this mixture require only infrequent cleaning, for example weekly.

Resin mixtures of the kind described preferably comprise a resin which sets without emission of volatile products and the mixture is then suitable for setting at atmospheric pressure. When using such resin mixtures for injection into moulds containing fibrous reinforcing material it has been found important, in order to obtain mouldings of maximum strength, that the fibrous reinforcement and the interior of the moulds should be free from moisture or other matter volatile at room temperatures.

According to a feature of the present invention therefore, in a case where the injection of a resin mixture is to take place into a mould containing fibrous reinforcing material, the injection process proper may be preceded by a preliminary step of passing dry air through the mould for a sufficient time to remove from within the mould moisture or other matter volatile at room temperatures. The air may be warmed to improve its drying action but care should be taken not to warm the mould to such an extent as to produce such rapid gelling of the injected resin mixture as to jeopardise complete impregnation of the fibrous reinforcement.

Preferably the process of injection is carried out as described in the specification accompanying British Patent application No. 3004/55.

The present invention also provides an apparatus for the injection into moulds of resin mixtures of the kind described, which apparatus comprises two containers for resin mixture, a mixture chamber, means providing a flow passage from the bottom of each container to the mixing chamber, means providing an injection passage from the mixing chamber into a mould and means for obtaining a flow of resin at controlled pressure from said containers through each of said flow passages into the mixing chamber, and from said mixing chamber through said injection passage.

According to another feature of the invention, means may be provided for admitting air at controlled pressure into each container to obtain said flows into the mixing chamber and from the mixing chamber through said injection passage.

The two containers for resin mixture may, according to another feature of the invention, be identical in size and shape and be similarly connected to the air supply and to the mixing chamber so as to promote equality of flow from the containers into the mixing chamber.

According to a further feature of the invention, two containers for a cleaning solvent may be provided arranged at different levels together with a first flow passage conecting the bottom of the higher of the containers to the lower of the containers, valve means in said first flow passage for preventing flow from the lower to the higher container, a second flow passage from the bottom of the lower of the containers to the mixing chamber, said second flow passage containing valve means for preventing flow from the mixing chamber through said second flow passage, means for admitting air at controlled pressure to the lower of the containers and an inlet to the upper of the containers to which the injection passage may be connected.

According to a still further feature of the invention, the apparatus may include an air drier, means for supplying air at controlled pressure to the air inlet of the drier, and means for conveying dried air from the air outlet of the drier to the interior of a mould.

Further features of the invention consist in the provision, when partly or wholly automatic working is desired, of means for operating according to a desired time cycle the means for supplying air at controlled pressure to the air inlet of the drier, the means for obtaining a flow of resin at controlled pressure through the mixing chamber and injection passage, the means for connecting the injection passage to the upper of the containers for cleaning solvent and the means for admitting air at controlled pressure to the lower of the containers for cleaning solvent.

Injection processes according to the invention and apparatus according to the invention for carrying out the processes will now be described by way of example with reference to the accompanying drawings in which:

Figure 1 shows one apparatus according to the invention which may be used for carrying out an injection process according to the invention, Figure 2 shows part of the apparatus of Figure 1 to a larger size, and Figure 3 shows a modification of part of the apparatus of Figure 1 enabling the apparatus to be used for an alternative injection process according to the invention.

Referring to Figure 1 the apparatus shown therein comprises two identical containers 1 and 2.

The containers are joined at their tops by conduit means in the form of a pipe 3 having a branch 4 connected through a control valve 5 to a compressed air line 6. The air line 6 may be supplied from a normal workshop air line working at 80 pounds per square inch, in which case the connection is preferably made through a pressure reducing valve 7 adjusted to reduce the pressure to 20 pounds per square inch. The valve 5 is of the 3-way type having a plug 8 with a T-shaped passage 9. The plug 8 is rotatable from the position shown, in which the lines 3 and 6 are connected by the passage 9, through a closed position to a position in which the line 3 is connected, by the passage 9, to atmosphere through a port 10 in the casing of the valve. The line 3 is also connected by a branch 11 to a pressure gauge 12. Instead of this arrangement each container may be separately connected to the air line 6 by a valve and provided with a separate pressure gauge, such an arrangement being advantageous where there is a possibility of the viscosities of the two mixtures differing considerably.

From the bottom of each container pipes 13 and 14 lead to a mixing chamber 15 (see also Figure 2) having a glass window 16, while from the mixing chamber as at 17′ (Figure 2) extends a flexible injection pipe 17 provided at its end with a union fitting 18 for attachment to an inlet fitting on a mould into which resin mixture is to be injected. The pipes 13 and 14 advantageously open into the mixing chamber opposite one another as shown in Figure 2 and the openings are closed by conical plugs 19 pressed apart by a coil spring 20 common to both plugs. The plugs 19 constitute non-return valves the purpose of which will presently be obvious. To permit re-filling of the containers 1 and 2 three-way cocks 21 and 22 are provided in the pipes 13 and 14, the re-filling pipe from a supply vessel, not shown, being connected when required to the third branch of the cock. Each container is provided with a gauge glass 23, 24 respectively, these glasses enabling the extent of filling to be checked and also the rate of emptying, so that the two flows of mixture to the mixing chamber may be kept in the proper proportion.

The apparatus also includes two containers 25, 26 for a cleaning solvent such as acetone. The container 25 is a gravity supply tank and is arranged at a higher level than the other container 26, being connected to it by a pipe and shut-off cock 27. The gravity supply tank 25 is further provided with a filler cap 28, vent pipe 29 and a union fitting 30 to which the connection 18 on the end of the injection pipe 17 may be attached. The container 26 is a pressure tank and is connected by a pipe 31 containing a shut-off cock 32 to the air line 6. A further pipe 33 containing a shut-off cock 34 extends from the bottom of the pressure tank to the mixing chamber 15. The manually operated cocks 27 and 34 shown in the drawing may if desired be replaced by non-return valves to reduce the number of manual operations required and the risk of mistakes. In this case the non-return valve which replaces the cock 34 is lightly loaded into the closed position to prevent as will hereinafter become clear, undesired leakage of solvent into the mixing chamber, and the pressure tank is provided with a vent of sufficient size to prevent pressure building up in the tank due to leakage of air past the cock 32.

To enable the inside of moulds and fibrous reinforcement contained in them to be thoroughly dried before injection is started, the apparatus includes an air drier 35 which may, for example be of the silica gel type and be provided with a regenerator 36 which may be supplied with electric current through a cable 37 and plug 38. Air is supplied to the drier from the air line 6 through a pipe 39 and shut-off cock 40, and a flexible pipe 41, having at its end a suitable union fitting 42, is provided to lead air from the drier to a mould to be treated. A thermometer 43 for indicating workshop temperature is preferably included in the apparatus, and in the case of a small plant the whole of the apparatus may conveniently be mounted on a trolley so that it can be moved around the workshop to wherever it may be required.

When making the apparatus just described ready for an injection moulding process according to the invention, the containers 1 and 2 are filled with resin mixture through the pipes 13 and 14 respectively, the three-way cocks 21 and 22 being set to open these pipes to the third connection of these cocks to which is attached a supply pipe. The required resin mixtures are then pumped through the supply pipes and the pipes 13 and 14 into the respective containers. In order to allow the resin mixture to enter the containers the valve 5 is set to vent the tops of the containers to atmosphere through the pipe 3 and the port 10. As the containers are filled the level of resin mixture in the containers may be checked by means of the glass gauge 23 or 24 associated with the container. When the containers have been filled with resin mixture to the required level the cocks 21 and 22 are moved to their closed position and the valve 5 is also closed.

In the apparatus just described the containers 1 and 2 are of identical size and shape and the containers are filled one with a mixture of liquid resin and catalyst, for example the resin may be a resin marketed under the trade description "Marco Resin 28C" manufactured by Scott Bader and Company Limited and the catalyst may be catalyst paste "H" made by the same manufacturer, and the other container is filled with a mixture of liquid resin and an accelerator, for example the same resin Marco 28C and accelerator "E" made by the same manufacturer, the concentration of catalyst and accelerator in their respective quantities of liquid resin being twice that which would normally be used so that when equal quantities of the two mixtures are brought together the concentration of catalyst and accelerator in the liquid resin will be the required proportions to the total amount of liquid resin in the combined mixture. One way of arriving at the two mixtures is to take a sufficient quantity of the liquid resin, catalyst and accelerator to make a required amount of the moulding mixture and then mix the catalyst with one half of the liquid resin and the accelerator with the other half of the liquid resin the two mixtures being introduced into the tanks 1 and 2 respectively.

Assuming that injection of resin mixture is to take place into a mould containing fibrous reinforcing material, the fitting 42 on the pipe 41 leading from the air drier 35 is connected up to a suitable inlet fitting on the mould, and the cock 40 is opened to pass dry air through the mould for a sufficient time to remove from within the mould moisture or other matter which is volatile at the room temperature at which resin mixture is injected into the mould is to be set.

If desired the dry air supplied by the drier 35 may be warmed to a certain extent before it is passed into the mould. Care should be taken however that the air is not warmed to such an extent that the temperature of the mould is raised to a level at which it might cause such rapid gelling of the resin mixture injected into the mould as to jeopardize complete impregnation of the fibrous reinforcing material contained within the mould.

After dry air has been passed through the mould for what is judged to be a sufficient time (calculated by experiment) the cock 40 is closed and the fitting 42 disconnected from the mould. The fitting 18 on the injection pipe 17 is then connected to the same or further inlet fitting on the mould. The cocks 21 and 22 are then set to communicate the pipes 13 and 14 with the mixing chamber 15 and the valve 5 is set to supply compressed air from the airline 6 to the tops of the containers 1 and 2 through the pipe 3. Air under pressure is accordingly introduced into the tops of the containers 1 and 2 and the resin mixtures in the containers are caused to flow in equal proportion from the containers through the pipes 13 and 14 respectively into the mixing chamber 15 and from the mixing chamber 15 through the injection pipe 17 into the mould.

In passing into the mixing chamber from the pipes 13 and 14 the resin mixtures displace the plugs 19 from their seatings against the action of the spring 20 and the conical form of the plugs has the effect of dispersing the flows of resin mixture as they enter the mixing chamber, the plugs therefore promoting a better mixing of the two resin mixtures in the mixing chamber.

During injection of moulding (i. e. the combined) mixture, the equality of flows from the containers 1 and 2 is checked by observing the glass gauges 23 and 24, and, if required, an adjustment of one of the flows is effected by partially closing the relevant cock 21 or 22 in order to maintain the two flows equal.

Once injection of moulding mixture into the mould has been completed the cocks 21 and 22 are closed, together with the valve 5, and the mould is disconnected from the fitting 18.

The two mixtures entering the mixing chamber from the pipes 13 and 14 flow through and around the spring 20 but the rate of flow of the mixtures is insufficient materially to displace the spring from its position between the conical plugs 19.

When the apparatus is in use as just described the mixing chamber 15 and the injection pipe 17 require to be cleaned of resin mixture at frequent intervals, for example after each injection operation when large or medium size mouldings are being made or for example every thirty minutes when a run of smaller mouldings is being made. This becomes necessary, as previously explained because, when using a moulding mixture which sets in a commercially acceptable time at room temperatures, the moulding chamber and especially the injection pipe tend to become clogged with set or partially set moulding mixture. This is not true however of the pipes 13 and 14 and the containers 1 and 2 because the resin mixtures contained in the containers 1 and 2 and passed through the pipes 13 and 14 are not resin mixtures which have the rapid setting characteristic because in the one case the mixture is lacking the required catalyst and in the other case the mixture is lacking the required accelerator.

Assuming that the injection step described above was either the last of the run of small mouldings or was an injection step into a large or medium size mould, and consequently therefore that the mixing chamber 15 and the injection pipe 17 require to be cleaned of set or partially set moulding mixture, the operator next proceeds as follows.

The fitting 18 on the injection pipe 17 is connected to the union fitting 30 on the gravity tank 25 containing cleaning solvent, and the cock 27 is opened to allow solvent to run down from the tank 25 into the tank 26 whereafter the cock 27 is again closed. The cock 34 is then opened and next the cock 32 so that compressed air is admitted to the container 26 from the airline 6 and the pressure generated in the container 26 drives the solvent vigorously through the mixing chamber 15 and the injection pipe 17 back into the container 25 thereby cleaning the mixing chamber and the injection pipe of resin mixture.

The solvent in the mixing chamber 15 is prevented from entering the pipes 13 and 14 and the containers 1 and 2 by the conical plugs 19 which under the action of the spring 20 act as non return valves.

When all the solvent has been passed from the tank 25 to the tank 26 the cock 32 is closed and then the cock 34, and the fitting 18 is disconnected from the fitting 30. The apparatus is then ready for injecting moulding mixture into another mould.

Instead of the containers 1 and 2 being of the same size and shape as previously described it will be appreciated that these containers can be of different sizes and shapes, and the two flows of resin mixture from the containers may be equal, as previously described, or unequal, the only requirement being that the resultant mixture of the two mixtures, formed in the mixing chamber, is a moulding mixture in which the liquid resin, catalyst and accelerator are present in the required proportions.

In a case for example where two mixtures are required to flow in unequal proportions to give a required moulding mixture when the two mixtures are themselves mixed together, the fact that the two flows are flowing in the required proportions to one another can be checked by adding suitable dyes to the two mixtures. For example a yellow dye may be added to one of the mixtures and a blue dye to the other of the mixtures in proportions such that when the two mixtures are themselves mixed together in the required proportions the resultant colour of the combined mixture is a predetermined shade of green. The two flows are then adjusted so that a mixture having a colour which is the predetermined shade of green is obtained in the mixing chamber. This method of checking the proportions of the flows of the two mixtures has the added advantage that it also enables the thoroughness of the mixing in the mixing chamber to be checked and for this reason it may be used in conjunction with the direct observation method employing the glass gauges 23 and 24 if desired, when operating as previously described with reference to Figures 1 and 2, and it is for the purpose of ascertaining the colour of the mixture in the mixing chamber that the mixing chamber shown in Figures 1 and 2 is provided with the glass window 16.

The apparatus described with reference to Figures 1 and 2 may be made suitable for partly or wholly automatic working by the provision of timing devices for automatically operating the various valves and cocks, more particularly the cock 40 for controlling the supply of air to the drier 35, the valve 5 or the cocks 21 and 22 for controlling the flow of resin mixture to the mould and the cock 32 for controlling the admission of air into the cleaning solvent tank 26. A cleaning solvent return pipe, not shown in Figures 1 and 2 of the drawings, may also be provided branching from a point in the injection pipe 17 as near as possible to the connection 18 and connected to the gravity tank 25 at 30, an automatically operated shut-off cock being provided in this pipe to prevent escape of resin mixture along it during injection.

The apparatus described with reference to Figures 1 and 2 is intended as a portable apparatus. In the case of a fixed plant, however, the containers 1 and 2 may be made to a considerably larger size and fixed at a suitable height above the workshop floor so that the resin mixtures contained in them may be fed into the mixing chamber at the required pressure under the action of gravity.

In order to operate in this manner the apparatus shown in Figures 1 and 2 is modified as shown in Figure 3. The modified apparatus comprises two containers 50 and 51 for the resin mixtures these containers being mounted at a suitable height above the workshop floor. In this case, of course, the connection between the airline 6 and the tops of the containers is dispensed with and instead the containers are vented at their tops as indicated at 52 and 53. The containers are also provided with remote indicating contents gauges 60, 61 instead of the glass gauges 23, 24. The gauges 60, 61 may be for example of the electrical transmission type each using a transmitter at the top of one of the tanks, the transmitter in each case being operated by a float or an Archimedean screw. In all other respects the modified apparatus is as previously described, the flows of resin mixtures from the containers 50 and 51 being controlled by the three-way cocks 21 and 22 which again provide connections through which the containers 50 and 51 may be filled. Alternatively however the containers 50, 51 may be provided with filler caps so that they may be filled directly with resin mixture.

The containers 50 and 51 are made to an identical size and shape and are filled with resin mixtures which require to be mixed in equal proportions to give the required moulding mixture.

We claim:

1. A process for injecting into a mould a moulding mixture comprising a liquid resin, a catalyst and an accelerator, which moulding mixture sets at room temperatures in a commercially acceptable time, said process comprising mixing two separate quantities of the liquid resin, one with a quantity of the catalyst and the other with a quantity of the accelerator, the ratio of the ingredients of each mixture being such that when the two mixtures are themselves mixed together in a predetermined ratio the combined mixture of the liquid resin, the catalyst and the accelerator is the required moulding mixture, causing the two mixtures to flow together in said predetermined ratio and to become homogeneously mixed, and passing the flowing homogeneous mixture into a mould.

2. A process for injecting into a mould a moulding mixture comprising a liquid resin, a catalyst and an accelerator, which moulding mixture sets at room temperatures in a commercially acceptable time, said process comprising mixing two separate quantities of the liquid resin, one with a quantity of the catalyst and the other with a quantity of the accelerator, the ratio of the ingredients of each mixture being such that when the two mixtures are themselves mixed together in a predetermined ratio the combined mixture of the liquid resin, the catalyst and the accelerator is the required moulding mixture, causing the two mixtures to flow into a common vessel together in said predetermined ratio so that the two mixtures become homogeneously mixed, passing the flowing homogeneous mixture from the vessel through conduit means into a mould, stopping the flow of said two mixtures into the common vessel, and then passing a solvent through said common vessel and said conduit means to clean them of resin mixture.

3. A process for injecting into a mould containing fibrous reinforcing material, a moulding mixture comprising a liquid resin, a catalyst and an accelerator, which moulding mixture sets at room temperatures in a commercially acceptable time, said process comprising mixing two separate quantities of the liquid resin, one with a quantity of the catalyst and the other with a quantity of the accelerator, the ratio of the ingredients of each mixture being such that when the two mixtures are themselves mixed together in a predetermined ratio the combined mixture of the liquid resin, the catalyst and the accelerator is the required moulding mixture, passing dry air through the mould for a sufficient time to remove from within the mould any matter which is volatile at room temperatures, causing the two mixtures to flow together in said predetermined ratio and to become homogeneously mixed, and passing the flowing homogeneous mixture into the mould.

4. A process for injecting into a mould a moulding mixture comprising a liquid resin, a catalyst and an accelerator, which moulding mixture sets at room temperatures in a commercially acceptable time, said process comprising mixing two separate quantities of the liquid resin, one with a quantity of the catalyst and the other with a quantity of the accelerator, the ratio of the ingredients of each mixture being such that when the two mixtures are themselves mixed together in a predetermined ratio the combined mixture of the liquid resin the catalyst and the accelerator is the required moulding mixture, passing dry air through the mould for a sufficient time to remove from within the mould any matter which is volatile at room temperatures, causing the two mixtures to flow into a common vessel together in said predetermined ratio so that the two mixtures become homogeneously mixed, passing the flowing homogeneous mixture from the vessel through conduit means into the mould, stopping the flow of said two mixtures into the common vessel, and then passing a solvent through said common vessel and said conduit means to clean them of resin mixture.

5. A process for injecting into a mould a moulding mixture comprising a liquid resin, a catalyst, and an accelerator which moulding mixture sets at room temperatures in a commercially acceptable time, said process comprising taking sufficient quantities of the liquid resin, catalyst and accelerator to make a required amount of the moulding mixture, mixing the catalyst with one half of the liquid resin and the accelerator with the other half of the liquid resin, and then causing the two mixtures to flow together in equal proportions and to become homogeneously mixed, and passing the flowing homogeneous mixture into a mould.

6. A process for injecting into a mould a moulding mixture comprising a liquid resin, a catalyst, and an accelerator, which moulding mixture sets at room temperatures in a commercially acceptable time, said process comprising taking sufficient quantities of the liquid resin, catalyst and accelerator to make a required amount of the moulding mixture, mixing the catalyst with one half of the liquid resin and the accelerator with the other half of the liquid resin, and then causing the two mixtures to flow into a common vessel together in equal proportions and to become homogeneously mixed, passing the flowing homogeneous mixture from the vessel through conduit means into a mould, stopping the flow of said two mixtures into the common vessel, and then passing a solvent through the common vessel and said conduit means to clean them of resin mixture.

7. A process for injecting into a mould containing fibrous reinforcing material, a moulding mixture comprising a liquid resin, a catalyst and an accelerator, which moulding mixture sets at room temperatures in a commercially acceptable time, said process comprising taking sufficient quantities of the liquid resin, catalyst and accelerator to make a required amount of the moulding mixture, mixing the catalyst with one half of the liquid resin and the accelerator with the other half of the liquid resin, passing dry air through the mould for a sufficient time to remove from within the mould any matter which is volatile at room temperatures, and then causing the two mixtures to flow into a common vessel together in equal proportions and to become homogeneously mixed, passing the flowing homogeneous mixture from the vessel through conduit means into a mould, stopping the flow of said two mixtures into the common vessel, and then passing a solvent through the common vessel and said conduit means to clean them of resin mixture.

8. A process for injecting into a mould a moulding mixture comprising a liquid resin, a catalyst and an accelerator, which moulding mixture sets at room temperatures in a commercially acceptable time, said process comprising mixing two separate quantities of the liquid resin, one with a quantity of the catalyst and a dye, and the other with a quantity of accelerator and a dye, the ratio of the ingredients of each mixture being such that when the two mixtures are themselves mixed together in a predetermined ratio the combined mixture of the liquid resin, the catalyst and accelerator is the required moulding mixture having a predetermined colour different from the colours of the two mixtures, causing the two mixtures to flow together and become homogeneously mixed in proportions such that the homogeneous mixture is of said predetermined colour, and passing the flowing homogeneous mixture immediately into a mould.

9. A process for injecting into a mould a moulding mixture comprising a liquid resin, a catalyst and an accelerator, which moulding mixture sets at room temperatures in a commercially acceptable time, said process comprising mixing two separate quantities of the liquid resin, one with a quantity of the catalyst and a dye, and the other with a quantity of accelerator and a dye, the ratio of the ingredients of each mixture being such that when the two mixtures are themselves mixed together in a predetermined ratio the combined mixture of the liquid resin, the catalyst and accelerator is the required moulding mixture having a predetermined colour different from the colours of the two mixtures, causing the two mixtures to flow into a common vessel together and become homogeneously mixed in proportions such that the homogeneous mixture is of said predetermined colour, passing the flowing homogeneous mixture from said vessel through conduit means into a mould, stopping the flow of said two mixtures into the common vessel, and then passing a solvent through said common vessel and said conduit means to clean them of resin mixture.

10. A process for injecting into a mould containing fibrous reinforcing material, a moulding mixture comprising liquid resin, a catalyst and an accelerator, which moulding mixture sets at room temperatures in a commercially acceptable time, said process comprising mixing two separate quantities of the liquid resin, one with a quantity of the catalyst and a dye, and the other with a quantity of accelerator and a dye, the ratio of the ingredients of each mixture being such that when the two mixtures are themselves mixed together in a predetermined ratio the combined mixture of the liquid resin the catalyst and accelerator is the required moulding mixture having a predetermined colour different from the colours of the two mixtures, passing dry air through the mould for a sufficient time to remove from within the mould any matter which is volatile at room temperatures, causing the two mixtures to flow into a common vessel together and become homogeneously mixed in proportions such that the homogeneous mixture is of said predetermined colour, passing the flowing homogeneous mixture from said vessel through conduit means into the mould, stopping the flow of said two mixtures into the common vessel, and then passing a solvent through said common vessel and said conduit means to clean them of resin mixture.

11. Injection moulding apparatus for injecting into a mould a moulding mixture comprising a liquid resin, a catalyst and an accelerator, which moulding mixture sets at room temperatures in a commercially acceptable time, said apparatus comprising a mixing chamber, first and second conduit means communicating with said mixing chamber for introducing into the mixing chamber the liquid resin, catalyst and accelerator to comprise said moulding mixture, a non-return valve between said first conduit means and said mixing chamber, a non-return valve between said second conduit means and said mixing chamber, third conduit means in communication with said mixing chamber, said third conduit means providing an injection passage by which resin mixture may be passed from said mixing chamber into a mould, and means for passing a cleaning solvent into said mixing chamber and through said injection passage.

12. Injection moulding apparatus for injecting into a mould a moulding mixture comprising a liquid resin, a catalyst and an accelerator, which moulding mixture sets at room temperatures in a commercially acceptable time, said apparatus comprising a mixing chamber, first and second conduit means communicating with said mixing chamber for introducing into the mixing chamber the liquid resin, catalyst and accelerator to comprise said moulding mixture, a non-return valve between said first conduit means and said mixing chamber, a non-return valve between said second conduit means and said mixing chamber, third conduit means in communication with said mixing chamber, said third conduit means providing an injection passage by which resin mixture may be passed from said mixing chamber into a mould, two containers for a cleaning solvent, one arranged above the other, means providing a first flow passage communicating the bottom of the higher container with the lower container, valve means in said first flow passage for preventing the flow of liquid from the lower into the higher container, means providing a second flow passage communicating the bottom of the lower container with said mixing chamber, valve means in said second flow passage for preventing the flow of liquid from said mixing chamber into said lower container, and means for admitting air at controlled pressure to said lower container.

13. Injection moulding apparatus for injecting into a mould a moulding mixture comprising a liquid resin, a catalyst and an accelerator, which moulding mixture sets at room temperatures in a commercially acceptable time, said apparatus comprising a mixing chamber, first and second conduit means communicating with said mixing chamber for introducing into the mixing chamber the liquid resin, catalyst and accelerator to comprise said moulding mixture, a non-return valve between said first conduit means and said mixing chamber, a non-return valve between said second conduit means and said mixing chamber, third conduit means in communication with said mixing chamber, said third conduit means providing an injection passage by which resin mixture may be passed from said mixing chamber into a mould, two containers for a cleaning solvent, one arranged above the other, means providing a first flow passage communicating the bottom of the higher container with the lower container, valve means in said first flow passage for preventing the flow of liquid from the lower into the higher container, means providing a second flow passage communicating the bottom of the lower container with said mixing chamber, valve means in said second flow passage for preventing the flow of liquid from said mixing chamber into said lower container, means for admitting air at controlled pressure to said lower container, and an inlet connection in said higher container to which said injection passage may be connected.

14. Injection moulding apparatus as claimed in claim 12, wherein said higher container is provided with a removable filler cap and a venting aperture.

15. Injection moulding apparatus comprising a liquid resin container, injection passage means communicating with the bottom of said container for conveying liquid resin from said container to a mould into which the liquid resin is to be injected, means for controlling and stopping flow of liquid resin through said passage means, a container for a liquid cleaning solvent, means for connecting said passage means to said cleaning solvent container and means for causing liquid cleaning solvent to flow from said cleaning solvent container through said passage means and back into said cleaning solvent container.

16. Apparatus as claimed in claim 15, comprising a second container which may receive liquid cleaning solvent, said first said liquid cleaning solvent container being arranged above said second container, means providing a flow passage communicating the bottom of the said first said liquid solvent container with said second container, and valve means in said flow passage for preventing the flow of liquid from the lower container into the higher container, said cleaning solvent flow causing means comprising means for admitting air at controlled pressure to said second container, and inlet means on said first liquid solvent container to which the end of said injection passage means is connectible.

17. Apparatus as claimed in claim 15, further comprising air supply piping with connection means for connection to a source of compressed air, an air drier having an air inlet pipe connected to said air supply piping and an air outlet pipe for connection to a mould into which injection of liquid resin is to take place, means for controlling and stopping the flow of air through said air drier, and an air inlet pipe connecting said air supply piping with said liquid resin container, whereby a flow of liquid resin from said liquid resin container through said passage means at controlled pressure may be obtained.

References Cited in the file of this patent

UNITED STATES PATENTS

| | | |
|---|---|---|
| 2,382,655 | Nichols | Aug. 14, 1945 |
| 2,422,809 | Stupakoff et al. | June 24, 1947 |
| 2,430,033 | Stacy et al. | Nov. 4, 1947 |
| 2,469,342 | Richardson | May 3, 1949 |
| 2,478,013 | Roddy | Aug. 2, 1949 |
| 2,531,218 | Johnson | Nov. 21, 1950 |
| 2,673,723 | Keen | Mar. 30, 1954 |
| 2,687,552 | Gabler | Aug. 31, 1954 |